US012589825B2

(12) United States Patent
  Watanabe

(10) Patent No.: US 12,589,825 B2
(45) Date of Patent: Mar. 31, 2026

(54) TRAINING BICYCLE AND BICYCLE FRAME

(71) Applicant: VITAMIN-I FACTORY CO., LTD., Tokyo (JP)

(72) Inventor: Mikio Watanabe, Tokyo (JP)

(73) Assignee: VITAMIN I FACTORY CO., LTD., Tokyo (JP)

( * ) Notice: Subject to any disclaimer, the term of this patent is extended or adjusted under 35 U.S.C. 154(b) by 571 days.

(21) Appl. No.: 18/015,063

(22) PCT Filed: Jul. 10, 2020

(86) PCT No.: PCT/JP2020/027078
  § 371 (c)(1),
  (2) Date: Jan. 7, 2023

(87) PCT Pub. No.: WO2022/009425
  PCT Pub. Date: Jan. 13, 2022

(65) Prior Publication Data
  US 2023/0271666 A1    Aug. 31, 2023

(51) Int. Cl.
  *B62K 13/08*    (2006.01)
  *B62H 7/00*    (2006.01)
  *B62J 13/04*    (2006.01)

(52) U.S. Cl.
  CPC .............. *B62K 13/08* (2013.01); *B62H 7/00* (2013.01); *B62J 13/04* (2013.01)

(58) Field of Classification Search
  CPC .......... B62K 13/08; B62K 9/00; B62K 19/24; B62K 3/02; B62K 13/00; B62K 19/34; B62K 2015/001; B62H 7/00; B62J 13/04; B62M 1/36
  See application file for complete search history.

(56) References Cited

U.S. PATENT DOCUMENTS

| | | | | |
|---|---|---|---|---|
| 640,756 | A | * | 1/1900 | Douglas ................ F16H 57/035 |
| | | | | 474/146 |
| 3,195,923 | A | * | 7/1965 | Moulton ................... B62K 3/10 |
| | | | | 280/281.1 |
| 4,421,337 | A | * | 12/1983 | Pratt ...................... B62K 25/30 |
| | | | | 280/277 |
| 4,925,203 | A | * | 5/1990 | Buckler ................... B62K 3/02 |
| | | | | 280/288.1 |

(Continued)

FOREIGN PATENT DOCUMENTS

| | | |
|---|---|---|
| CN | 104890782 A | 9/2015 |
| JP | 2002-106584 A | 4/2002 |

(Continued)

*Primary Examiner* — Timothy Wilhelm
(74) *Attorney, Agent, or Firm* — H&I PARTNERS; Chai Im; C. Andrew Im

(57) ABSTRACT

A pedal unit attachable/detachable training bicycle that easily attach/detach a chain and a pedal unit to/from a training bicycle that has a seat stay. The pedal unit attachable/detachable training bicycle includes a bicycle frame having a receiving member provided at bottom of a seat tube to connect a pedal unit. The pedal unit, which is configured to detachably attach to the receiving member. A chain threaded between the pedal unit and a rear wheel. The bicycle frame is configured to enable a seat stay on side of the chain wheel to be freely attached to and detached from the bicycle frame.

6 Claims, 8 Drawing Sheets

(56)  References Cited

U.S. PATENT DOCUMENTS

| | | | | | |
|---|---|---|---|---|---|
| 5,314,207 | A | * | 5/1994 | Camfield | B62K 9/00 280/828 |
| 5,335,929 | A | * | 8/1994 | Takagaki | B62K 25/286 280/283 |
| 5,441,292 | A | * | 8/1995 | Busby | B62K 25/30 280/284 |
| 5,505,493 | A | * | 4/1996 | Camfield | B62K 9/00 280/828 |
| 6,099,010 | A | * | 8/2000 | Busby | B62K 25/30 280/283 |
| 6,425,598 | B2 | * | 7/2002 | Murayama | B62K 15/008 280/200 |
| 6,581,494 | B2 | * | 6/2003 | Sechler | B62M 3/00 74/594.1 |
| 6,659,488 | B1 | * | 12/2003 | Beresnitzky | B62K 15/00 280/282 |
| 6,886,845 | B2 | * | 5/2005 | Chao | B62K 15/00 280/278 |
| 7,168,726 | B2 | * | 1/2007 | Klein | B62K 25/04 280/284 |
| 7,261,310 | B2 | * | 8/2007 | Yifrah | B62K 19/36 280/288.4 |
| 7,591,475 | B1 | * | 9/2009 | Calfee | B62K 25/04 280/284 |
| D614,538 | S | * | 4/2010 | Rochon | D12/111 |
| 7,722,070 | B2 | * | 5/2010 | Ritchey | B62K 15/00 280/278 |
| 7,798,513 | B1 | * | 9/2010 | Salvant | B62M 3/00 280/294 |
| 8,006,993 | B1 | * | 8/2011 | Chamberlain | B62K 25/22 280/281.1 |
| 8,439,383 | B2 | * | 5/2013 | Talavasek | B62K 21/02 280/285 |
| 8,464,609 | B2 | * | 6/2013 | Shiu | B62K 15/006 280/278 |
| 8,556,284 | B2 | * | 10/2013 | Appleman | B62K 3/00 280/278 |
| 8,707,825 | B2 | * | 4/2014 | Shiu | B62M 3/00 280/278 |
| 8,807,585 | B2 | * | 8/2014 | Alan | B62K 19/30 280/274 |
| 8,925,949 | B2 | * | 1/2015 | Zecchetto | G06Q 10/30 280/281.1 |
| 9,156,521 | B2 | * | 10/2015 | Lumpkin | B62K 3/02 |
| 9,359,036 | B2 | * | 6/2016 | Thompson | B62J 11/13 |
| 9,550,542 | B2 | * | 1/2017 | Figueroa | B60K 1/04 |
| 9,669,891 | B2 | * | 6/2017 | Evans | B62K 9/00 |
| 9,714,065 | B2 | * | 7/2017 | Mondello | B62J 25/06 |
| 9,821,879 | B2 | * | 11/2017 | Hoogendoorn | B62K 25/286 |
| 10,039,953 | B2 | * | 8/2018 | Prosnitz | B62K 13/00 |
| 10,300,974 | B1 | * | 5/2019 | O'Reilly | B62H 7/00 |
| 10,611,424 | B2 | * | 4/2020 | McFarland | B62K 25/02 |
| 10,850,785 | B2 | * | 12/2020 | O'Reilly | B62H 7/00 |
| 11,242,113 | B2 | * | 2/2022 | Gatto | B62M 3/00 |
| 12,246,792 | B2 | * | 3/2025 | Watanabe | B62K 19/34 |
| 2002/0084620 | A1 | * | 7/2002 | Yu | B62K 25/30 280/283 |
| 2004/0070165 | A1 | * | 4/2004 | Liebetrau | B62K 19/34 280/259 |
| 2004/0201199 | A1 | * | 10/2004 | Liebetrau | B62K 13/08 280/278 |
| 2011/0285106 | A1 | * | 11/2011 | Talavasek | B62K 21/02 280/284 |
| 2014/0015220 | A1 | * | 1/2014 | Talavasek | B62K 25/286 280/275 |
| 2014/0274582 | A1 | * | 9/2014 | Simmons | B62K 17/00 482/57 |
| 2016/0075400 | A1 | * | 3/2016 | Ragland | B62K 11/04 29/401.1 |
| 2018/0339744 | A1 | * | 11/2018 | McFarland | B62J 13/04 |
| 2021/0009228 | A1 | * | 1/2021 | Yi | A63B 22/0087 |
| 2024/0083535 | A1 | * | 3/2024 | Watanabe | B62K 9/00 |
| 2024/0253725 | A1 | * | 8/2024 | Pfaeffle | B62K 25/286 |

FOREIGN PATENT DOCUMENTS

| | | | |
|---|---|---|---|
| JP | 2007-32307 | A | 2/2007 |
| JP | 2013-147199 | A | 8/2013 |
| JP | 3212384 | U | 9/2017 |

* cited by examiner

TRAINING BICYCLE AND BICYCLE FRAME

TECHNICAL FIELD

The present invention relates to a training bicycle whose chain and pedal unit are detachable and a bicycle frame.

BACKGROUND ART

Training bicycles equipped with a detachable pedal unit have been developed and put to use. The pedal unit is made detachable from the bicycle mainly to facilitate bicycle riding practice. In actual implementation, a unit body part including a chain wheel and a pedal crank are detachably attached to a bicycle body by bolts or the like so as to enable fixed connection/release of the pedal unit using bolts and nuts (see Japanese Patent Publication No. 2013-147199A).

With this structure, a first-time bicycle rider, particularly a child, can initially mount the bicycle with the unit body part removed to acquire steering skill and sense of balance while kicking the ground to move about, and then, after attaining a degree of riding skill, the learner can mount the bicycle with the unit body part attached to the bicycle body to practice propelling the bicycle forward by pumping the pedals fastened to the pedal crank. This is an effective training method not only for children but also for elderly adults.

PRIOR ART DOCUMENTS

Patent Document: Japanese Patent Publication No. 2013-147199A

OBJECT AND SUMMARY OF THE INVENTION

Problem to be Overcome by the Invention

Most small training bicycles, particularly those for children, are not equipped with seat stays in view of the small body weight of the rider, so that attachment/detachment of the pedal unit and chain unit is easy. But bicycles equipped with seat stays have a problem in that attachment/detachment of the pedal unit and chain is difficult because chain installment requires removal of the rear wheel from the body.

The present invention was achieved to overcome the aforesaid problem and has as its object to provide a training bicycle whose chain and pedal unit can be easily detached, even if the bicycle is equipped with seat stays, and a bicycle frame.

Means for Solving the Problem

One embodiment of the present invention is a pedal unit attachable/detachable bicycle (1) including: a bicycle frame (100) having a receiving member (110) provided at bottom of a seat tube (120) for connecting a pedal unit (200); the pedal unit (200), which is adapted for detachable attachment to the receiving member (110); and a chain (500) threaded between the pedal unit (200) and a rear wheel (300), wherein the pedal unit (200) rotatably retains a pedal crank (220) having an axially attached chain wheel (210) and incorporates a connector (230) for connection to the receiving member (110), and the chain (500) is adapted to attachably/detachably connect the pedal unit (200) and chain (500) to the bicycle frame (100) upon being wrapped around the chain wheel (210) and a rear sprocket (310) installed on the rear wheel, which training bicycle is characterized in that the bicycle frame (100) is configured to enable a seat stay (150) on side of the chain wheel (210) to be freely attached to and detached from the bicycle frame (100).

As this configuration enables attachment/detachment of the seat stay (150) on the side of the chain wheel (210), attachment and detachment of the chain (500) and the pedal unit (200) can be easily performed even if the bicycle is equipped with seat stays (150).

In the aforesaid configuration, a structure can be adopted wherein the bicycle frame (100) is configured to comprise, at least on its pedal unit (200) side, a chain stay (130) that rotatably fastens the rear wheel (300).

In the aforesaid configuration, a structure can be adopted wherein a forward-upwardly extending inclined branch (132) is provided toward rear wheel side end of the chain stay (130) and rear end side of the seat stay (150) is fastened to the branch (132). This structure facilitates the work of attaching and detaching the seat stay (150) by optimizing the location and shape of the branch (132).

In the aforesaid configuration, a structure can be adopted wherein the pedal unit (200) is equipped with a chain cover (250) that covers the chain (500) and the branch (132) is provided outside the chain cover (250) so as to overlap the chain cover (250) in side view of the bicycle frame (100). This structure can be expected to have a strength enhancing effect by sandwiching the chain cover (250) with the branch (132).

In the aforesaid configuration, a structure can be adopted wherein the pedal unit (200) is equipped with a chain cover (250) that covers the chain (500), the chain cover (250) is formed with a through-hole (252) for passing the chain stay (130), and the chain stay (130) is passed through the through-hole (252) from the outside rear toward the inside front of the chain cover (250). This structure facilitates attachment of the chain cover (250) by attaching the chain stay (130) through the through-hole (252).

In the aforesaid configuration, a structure can be adopted wherein the chain cover (250) is divisible in forward-rearward direction and the through-hole (252) is formed to straddle the division in the chain cover (250). The fore-aft divisibility of the chain cover (250) according to this structure further facilitates chain cover attachment.

In the foregoing configuration, a structure can be adopted wherein rear end of the seat stay (150) is fastened on an axle (302) of the rear wheel (300). The use of the axle (302) to fasten the seat stay (150) according to this structure reduces the number of parts.

In the foregoing configuration, a structure can be adopted wherein a rearwardly open oval hole (152) is formed in rear end of the seat stay (150) and the rear end of the seat stay (150) is fastened on the axle (302) of the rear wheel (300) by a fastening member (136) provided in the oval hole (152). The rearwardly open oval hole (152) of this structure facilitates adjustment when attaching the seat stay (150).

In the foregoing configuration, a structure can be adopted wherein the pedal unit (200) is equipped with a chain cover (250) that covers the chain (500) and the seat stay (150) is attached outside the chain cover (250). This structure enhances stability by sandwiching the chain cover (250) with the seat stay (150).

In the foregoing configuration, a structure can be adopted wherein the seat stay (150) has a detachably attached member at either end and is detachably attached as a whole. This structure enables attachment/detachment of the whole seat stay (150), and since no intermediate gap is formed, strength of the bicycle frame (100) is enhanced when fitted with the seat stay (150).

Another embodiment of the present invention is a bicycle frame characterized in that, in a bicycle frame (100) to be attachably/detachably fitted with a pedal unit (200) and a chain (500), a seat stay (150) on side to which a chain wheel (210) is to be connected is detachably attached to the bicycle frame (100). According to this configuration, since the seat stay (150) on the side to which the chain wheel (210) is to be connected is attachable/detachable, attachment and detachment of the chain (500) and the pedal unit (200) can be easily performed even with respect to a training bicycle having the seat stays (150).

DETAILED DESCRIPTION OF THE EMBODIMENTS

Figure 1:
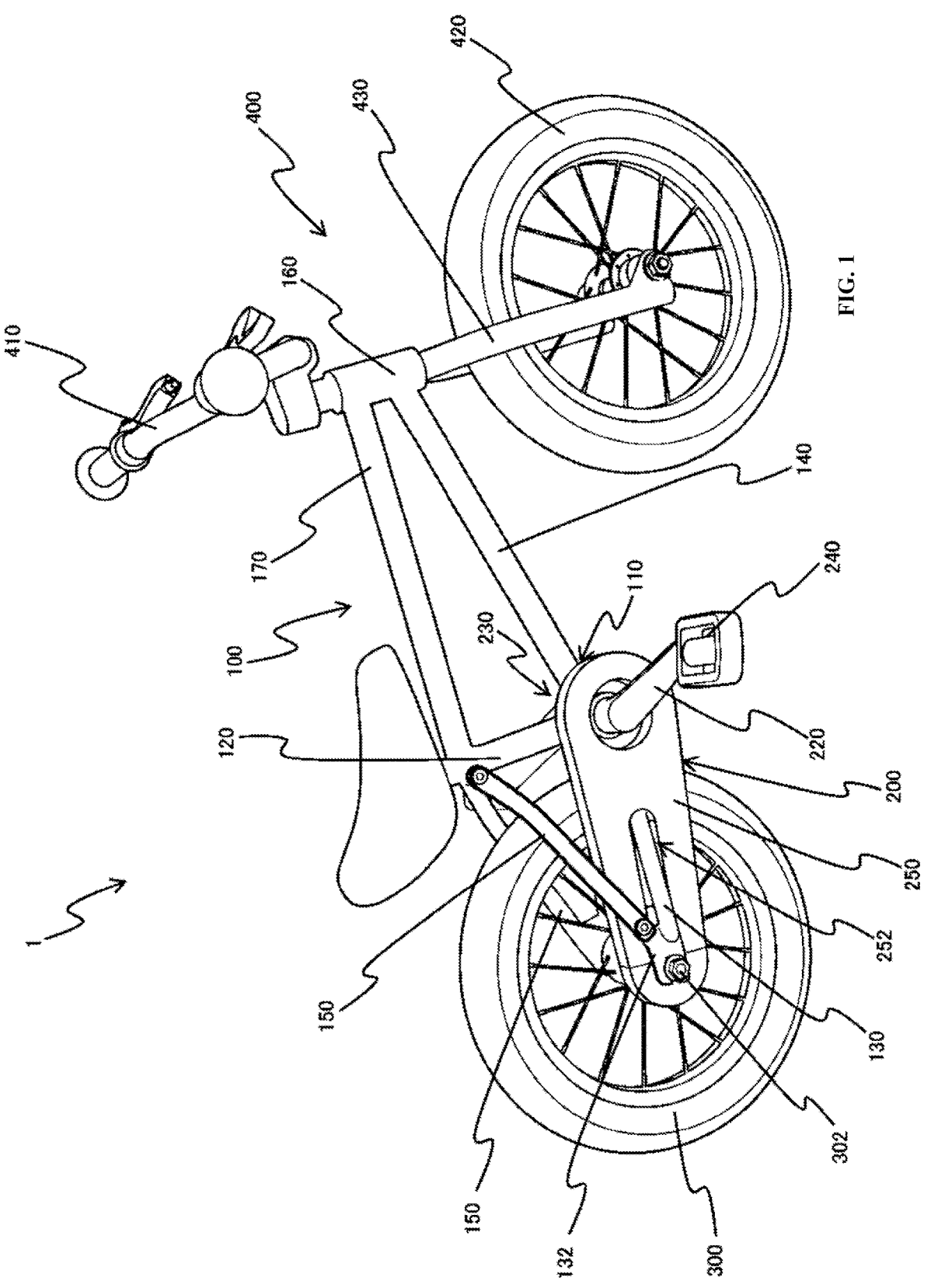
FIG. 1 is a side perspective view of a bicycle in accordance with the present invention.
Figure 2:
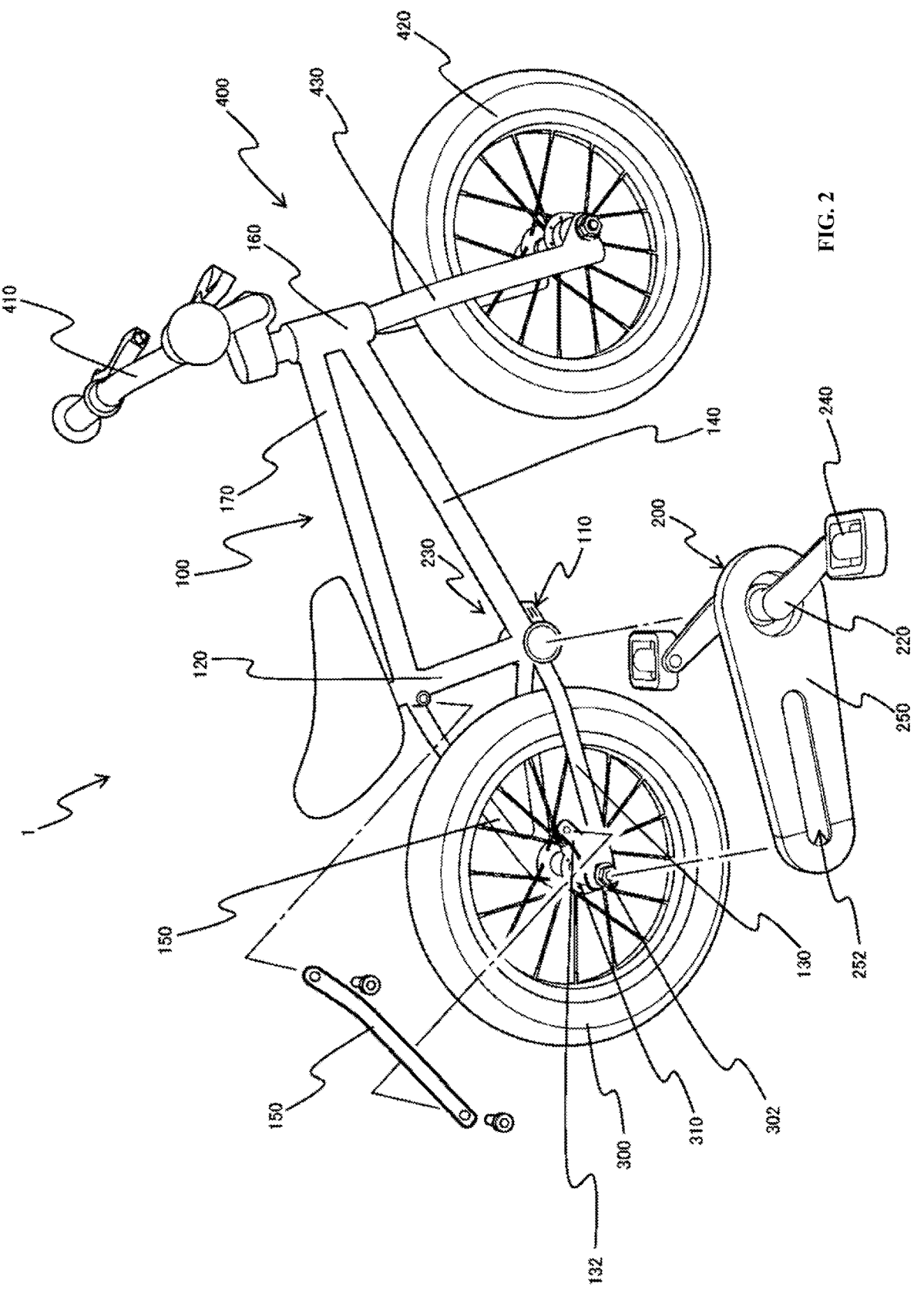
FIG. 2 is an exploded view of the bicycle.
Figure 3:
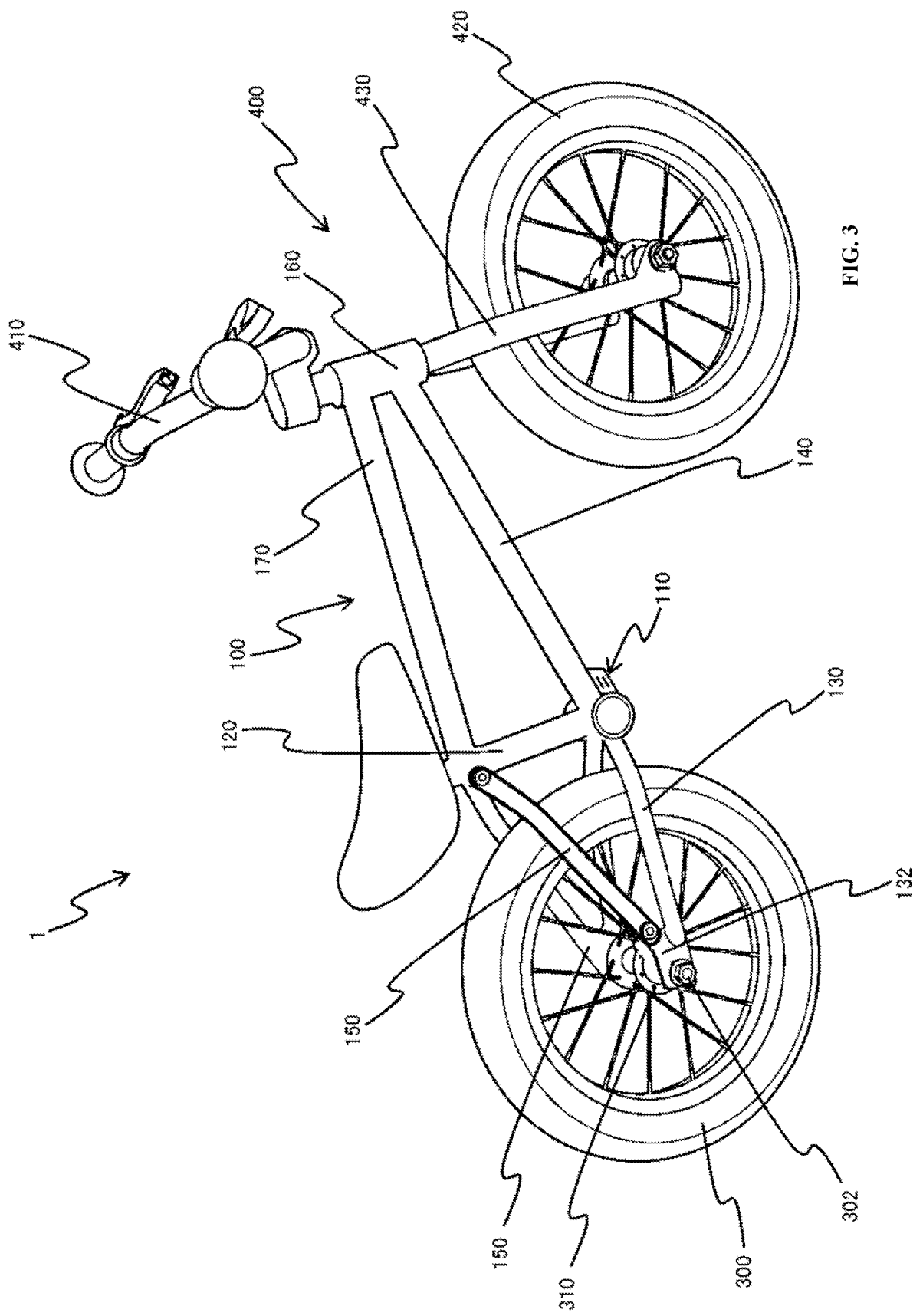
FIG. 3 is a side perspective view of the bicycle with pedal unit and chain removed.
Figure 4:
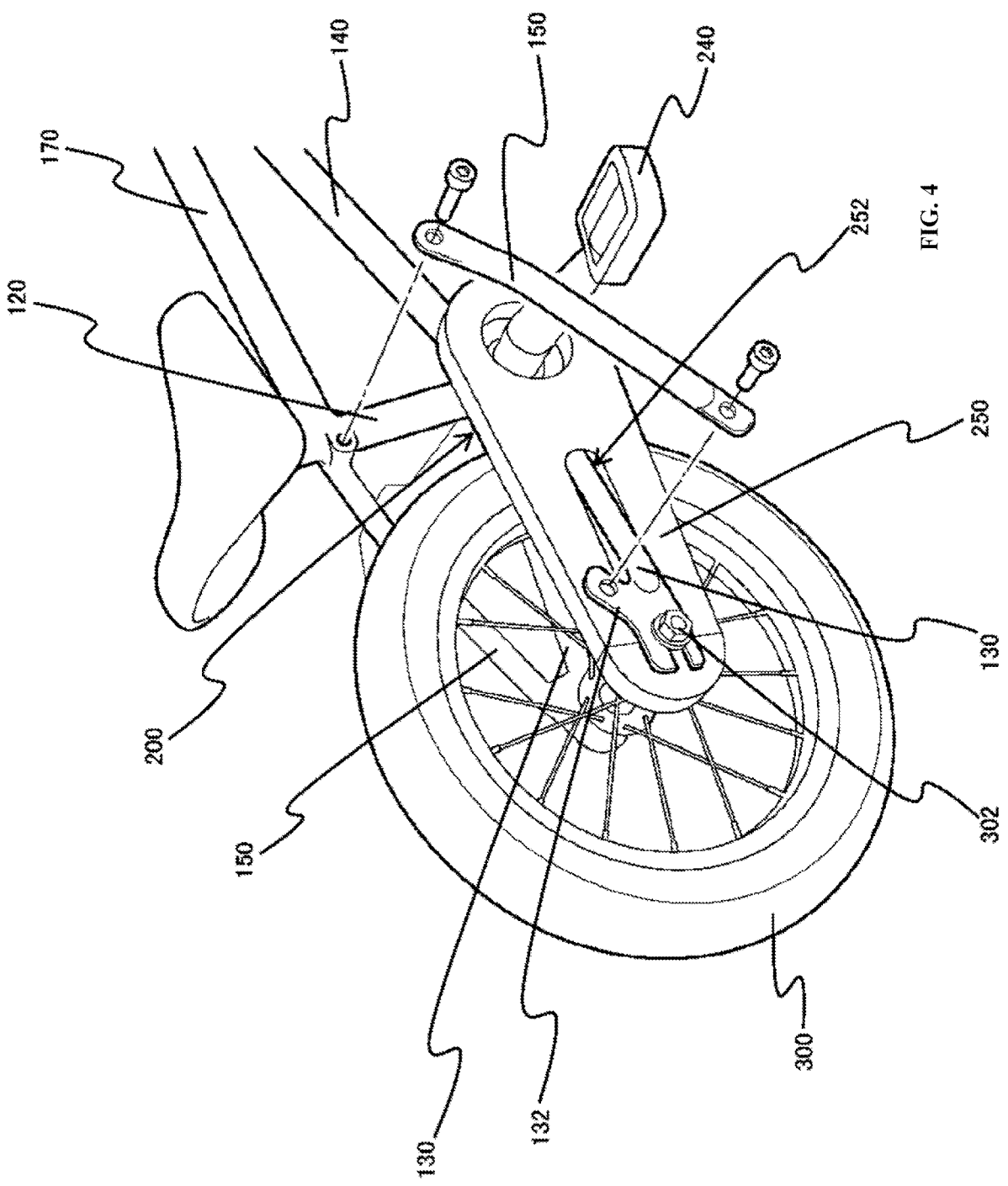
FIG. 4 is a rear perspective view showing seat stay connectors.
Figure 5:
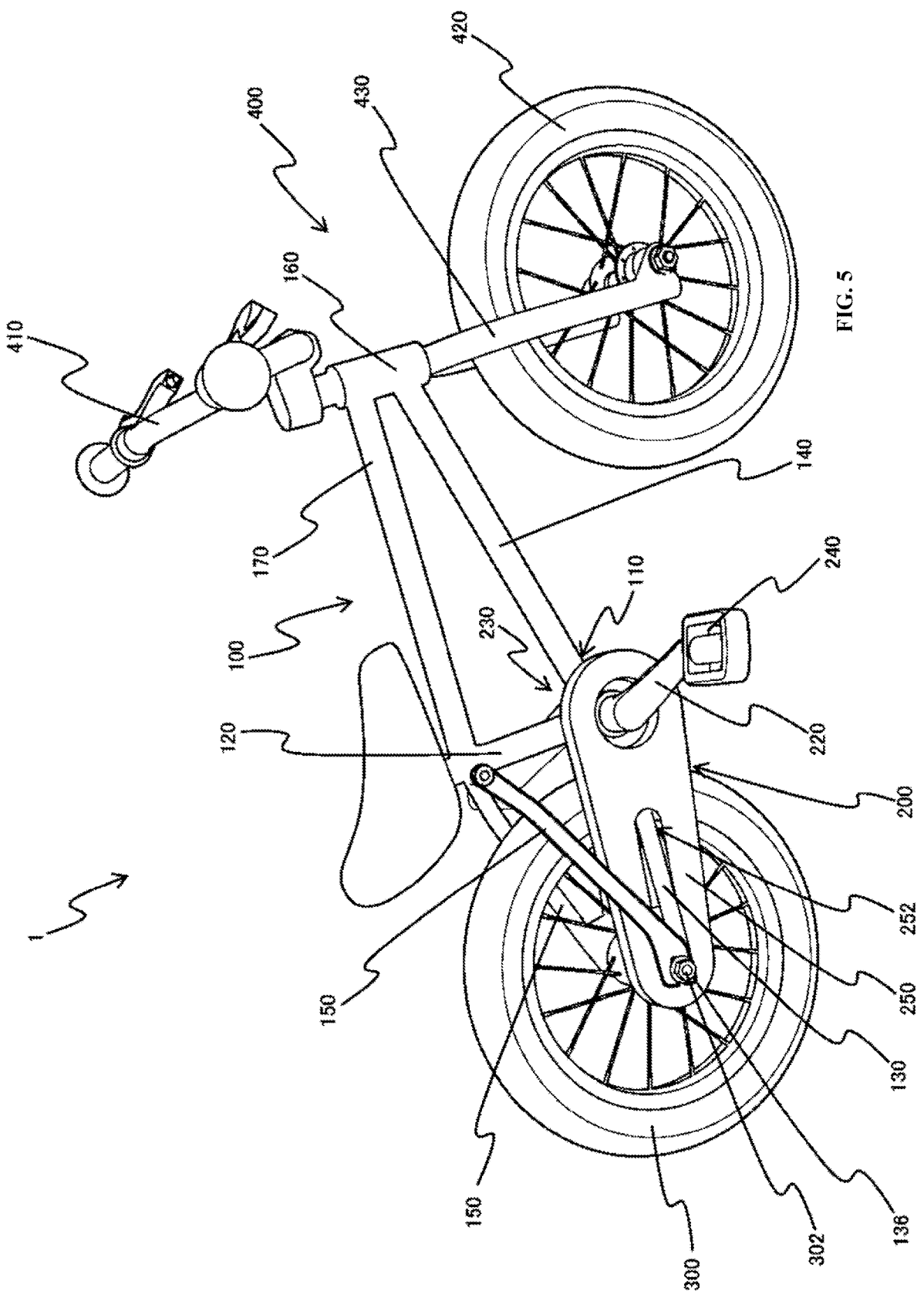
FIG. 5 is a bicycle side perspective view showing an embodiment of another seat stay connection structure.
Figure 6:
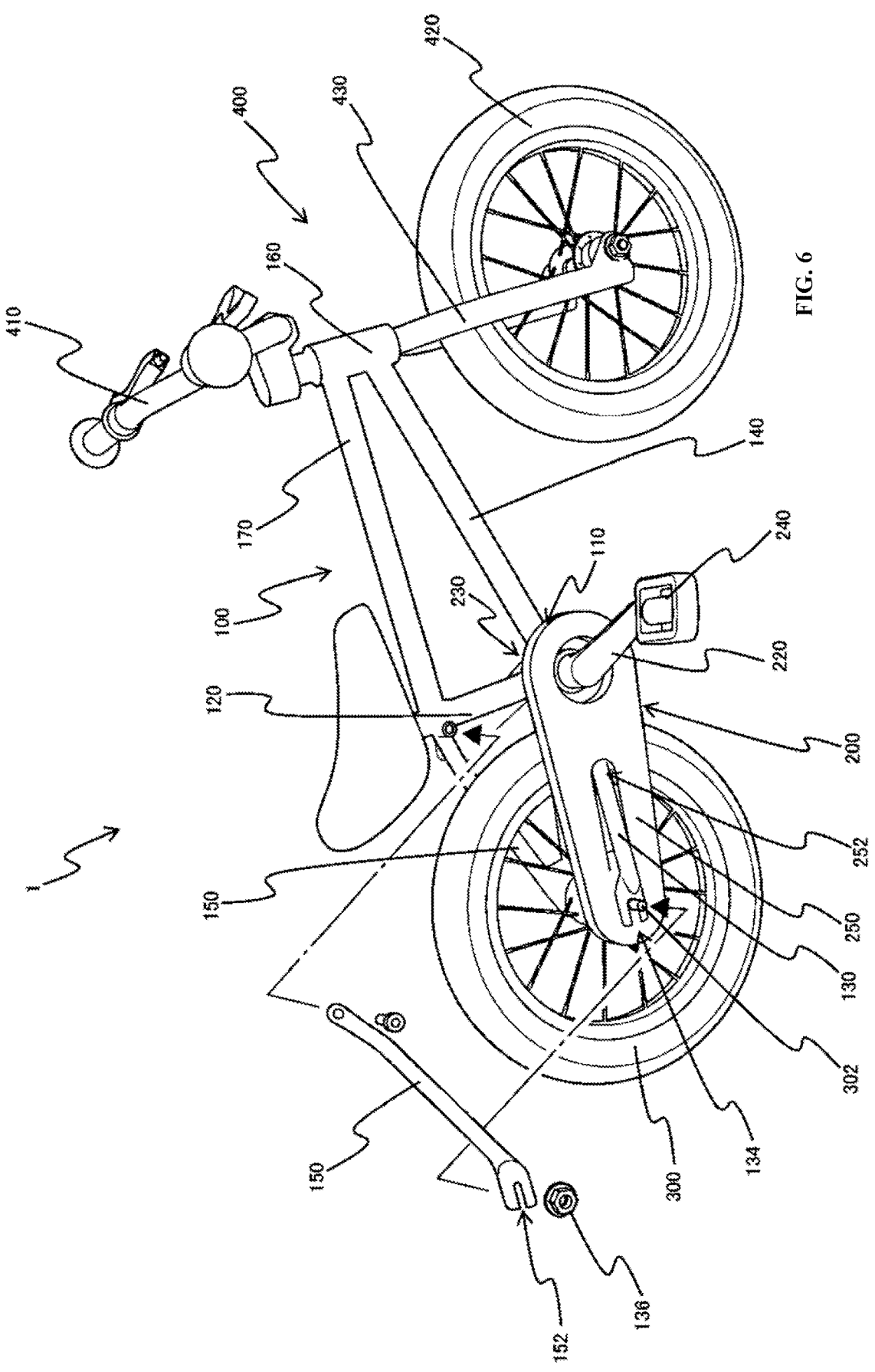
FIG. 6 is a side perspective view of the bicycle with seat stay removed.
Figure 7:
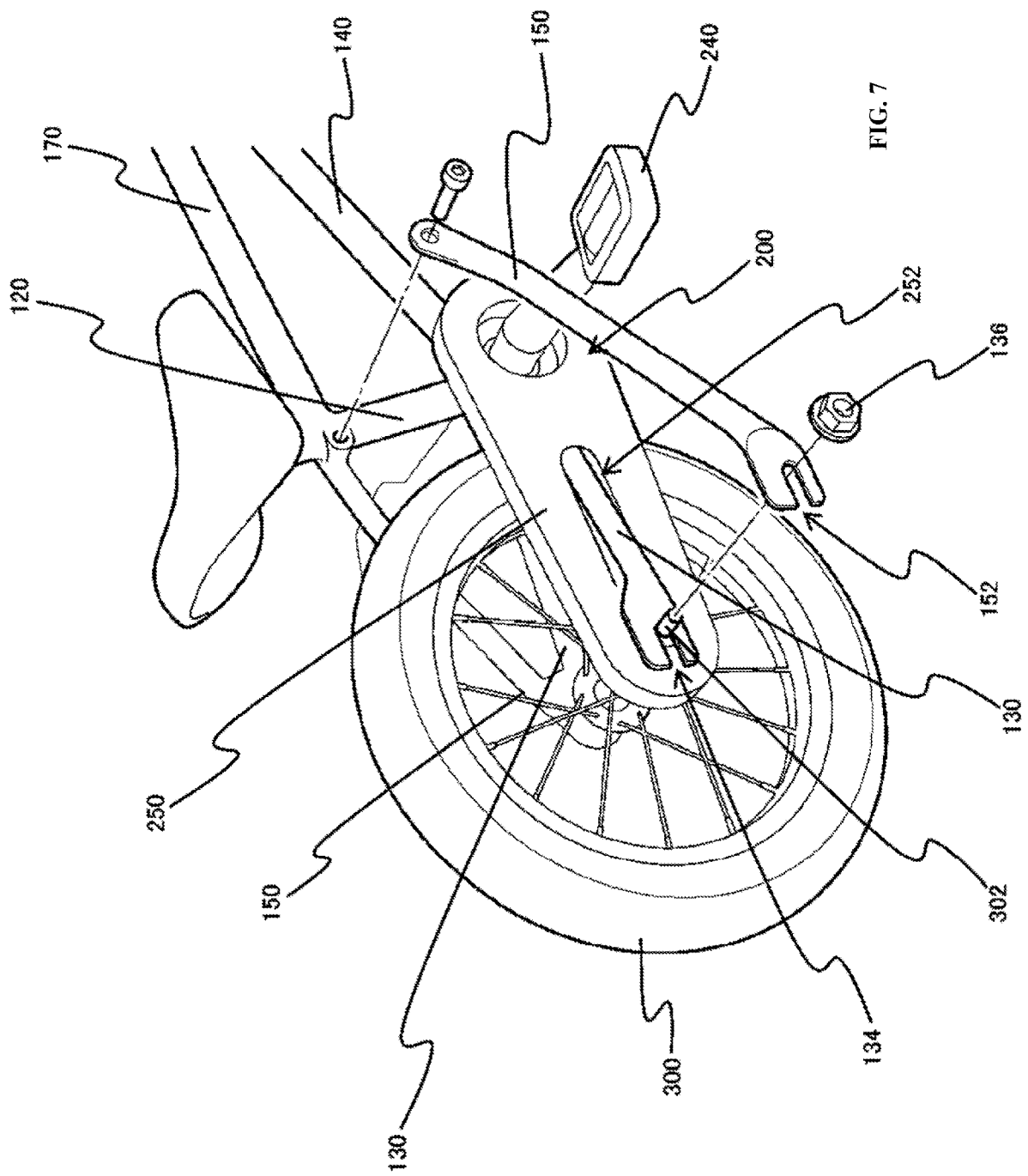
FIG. 7 is a rear perspective view showing seat stay connectors.

There now follows a detailed explanation of the bicycle and bicycle frame according to the present invention, based on embodiments shown in the drawings. FIG. 1 is a side perspective view of a bicycle in accordance with the present invention, and FIG. 2 is an exploded view of the bicycle. FIG. 3 is a side perspective view of the bicycle with pedal unit and chain removed, and FIG. 4 is a rear perspective view showing seat stay connectors. FIG. 5 is a bicycle side perspective view showing an embodiment of another seat stay connection structure, and FIG. 6 is a side perspective view of the bicycle with seat stay removed. FIG. 7 is a rear perspective view showing seat stay connectors, and FIG. 8 is a side perspective view showing interior of a pedal unit.

Figure 8:
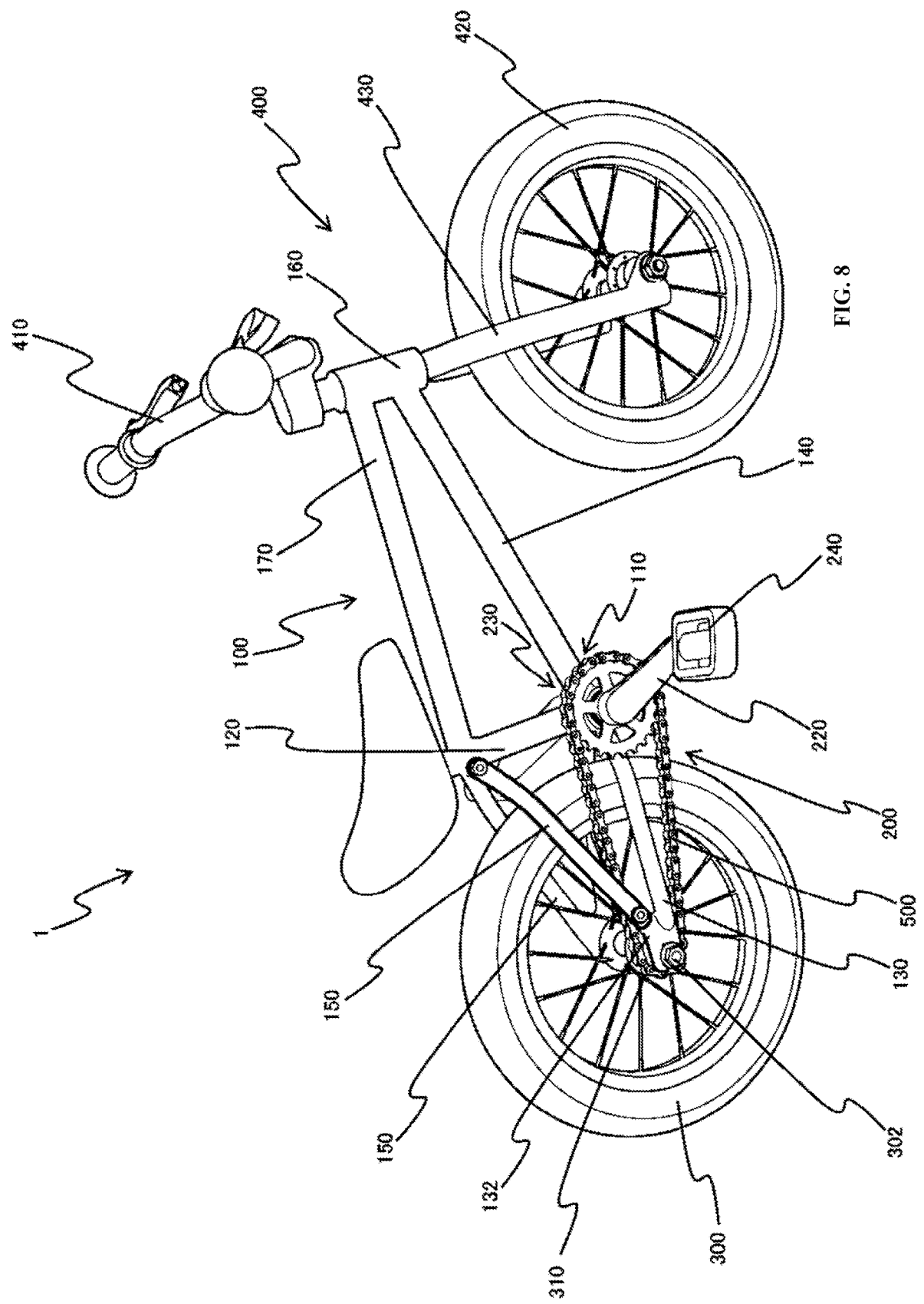
FIG. 8 is a side perspective view showing interior of a pedal unit.

As shown in FIG. 1, FIG. 2 and FIG. 8, a bicycle 1 according to the present invention comprises a bicycle frame 100, a pedal unit 200, a rear wheel 300, a handlebar structure 400 associated with a front wheel 420, and a chain 500. As a seat stay 150 is detachably installed, the bicycle enables easy attachment/detachment of the chain 500 and pedal unit 200 from the bicycle frame 100.

The bicycle frame 100 is the structural member constituting the body of the bicycle 1 according the present invention. As shown in FIG. 1, FIG. 2 and FIG. 8, it is equipped with the pedal unit 200, the rear wheel 300, the handlebar structure 400 associated with the front wheel 420, and the chain 500. The bicycle frame 100 is equipped with a seat tube 120, chain stays 130, a down tube 140, and seat stays 150. In the present embodiment, the handlebar structure 400 is installed in a head tube 160 located at the forward end of the down tube 140 so as to be rotatable right and left.

A top tube 170 can additionally be installed to interconnect upper part of the seat tube 120 and forward end of the down tube 140.

In this embodiment, the bicycle frame 100 is made of steel but it is not limited to steel and it is possible with a view to weight reduction to use aluminum, chromoly steel, carbon steel, titanium or resin, or to suitably choose from among other materials offering adequate strength.

The bicycle frame 100 is equipped with a receiving member 110. The receiving member 110 is a member for connecting the pedal unit 200 and, as shown in FIG. 1, is fixedly installed at the bottom of the seat tube 120 in a configuration for attachable/detachable connection of the pedal unit 200 to the bicycle frame 100 by bolts.

Alternatively, a structure can be adopted that fixedly installs the receiving member 110 at a location other than on the seat tube 120, such as on the lower end of the down tube 140 where it intersects the seat tube 120. Moreover, since the receiving member 110 is a component where foot force on the pedals concentrates when a rider mounts the bicycle and pumps the pedals, it is desirably a sturdy member that is strongly connected to the bicycle frame 100. In the present embodiment, the receiving member 110 is made of the same steel as the bicycle frame 100 but it is not limited to such material and it is possible with a view to weight reduction to use aluminum, chromoly steel, carbon steel, titanium or resin or to suitably choose from among other materials offering adequate strength. As an alternative working configuration of the receiving member structure, it is possible to form the receiving member 110 as a roughly cylindrical hollow structural member extending downward from the saddle and attach a pedal unit provided with a unit-side connector for insertion in the hollow structural member (see Japanese Patent Publication No. 2013-147199A, paragraphs [0017]-[0020] and FIG. 3). It is also possible to adopt a configuration that provides the receiving member with a gear member capable of concavo-convex engagement with a crank to enable pedal rotation with the crank inserted in the gear member (see International Publication WO 2018/216676, paragraphs [0050]-[0054] and [FIG. 1]-[ FIG. 2], [FIG. 8]-[FIG. 9].

The rear wheel 300 is mounted at the rear end of the chain stays 130. A rear sprocket 310 fitted on the rear wheel 300 has the chain 500 for transmitting rotational power of the pedal crank 220 wrapped therearound. In addition, the handlebar structure 400, which includes a front fork 430 incorporating a handlebar 410 and the front wheel 420, is mounted on the forward end of the down tube 140 via the head tube 160.

The pedal unit 200 comprises pedals 240, the pedal crank 220, a chain wheel 210 and a chain cover 250 and is adapted to be detachably attached to the bicycle frame 100. In the present embodiment, it is attachably/detachably connected to the receiving member 110. Further, the chain 500 is wrapped around the chain wheel 210 of the pedal unit 200 and the rear sprocket 310 of the rear wheel 300. The chain cover 250 covering the chain 500 is not an essential component of the pedal unit 200 but is preferably provided to protect the chain 500 and to prevent accidental contact between an operator and the chain.

The pedal unit 200 of the bicycle 1 according to the present invention rotatably retains the pedal crank 220 that axially supports the chain wheel 210 and is additionally equipped with the connecting member 230 for attachable/detachable connection to/from the receiving member 110 fixedly connected to the bicycle frame 100.

The main body of the pedal unit 200 rotatably retains the pedal crank 220 that axially supports the chain wheel 210 and is connected to the bicycle frame 100. The main body of the pedal unit 200 is equipped with the connecting member 230. The connecting member 230 is a member for connecting and fastening the pedal unit 200 to the bicycle frame 100 and in the present embodiment it is connected to the receiving member 110 provided on the bicycle frame 100.

In the present embodiment, the connecting member 230 is welded to the pedal unit 200 but it is not limited to this structure and can instead be provided by integral molding. Moreover, the connecting member 230 is made of the same steel as the bicycle frame 100 in the interest of ensuring strength, but it is not limited to such material and it is possible with a view to weight reduction to use aluminum, chromoly steel, carbon steel, titanium or resin or to suitably choose from among other materials offering adequate strength.

In the present embodiment, the receiving member 110 and the connecting member 230 are bolted together. Specifically, bolts inserted through holes (not shown) drilled in the receiving member 110 and connecting member 230 are fastened with nuts. Moreover, the holes drilled in one or the other of the receiving member 110 and the connecting member 230 can be oval holes. This makes it possible to tighten and loosen tension of the chain 500 wrapped around the chain wheel 210 and the rear sprocket 310.

Owing to the aforesaid configuration, the pedal unit 200 and the chain 500 can be detachably attached to the bicycle frame 100.

In the present embodiment, as shown in FIG. 1 to FIG. 4, the bicycle frame 100 is equipped with a pair of left and right chain stays 130. The chain stays 130 clamp the rear wheel 300 from opposite (left and right) sides and the wheel 300 is rotatably fastened at the distal end regions of the chain stays 130. One chain stay 130 is formed on the rear wheel side with a forward-upwardly extending inclined branch 132 and the rear end side of one seat stay 150, described later, is fastened to the branch 132 (see FIG. 4). The work of attaching and detaching the seat stay 150 is facilitated by optimizing the location and shape of the branch 132. As regards the chain stay 130 structure, it is alternatively possible to adopt a one-arm structure that fastens a chain stay on only one side. When a chain stay 130 is used on only one side, the chain stay 130 is preferably provided on the side of the chain wheel 210.

In the present embodiment, the bicycle frame 100 is equipped with seat stays 150 extending between the chain stays 130 and the upper part of the seat tube 120. One or the other of the right and left seat stays 150 of the bicycle 1 of the present invention is of attachable/detachable structure. In the present embodiment, the seat stay 150 on the side provided with the chain wheel 210 is detachably attached to the bicycle frame 100 and the seat stay 150 on the opposite side is fastened to the associated chain stay 130 and seat tube 120 by welding or the like. As explained later, this arrangement enables easy attachment and detachment of the pedal unit and the chain. Of note here is that while, as explained in the foregoing, seat stays 150 are provided on both sides of the rear wheel 300 in the present embodiment, it suffices for a seat stay 150 to be provided on at least the side of the chain wheel 210 (in the following description, "seat stay 150" refers to the attachable/detachable seat stay 150 provided on the side of the chain wheel 210).

Bicycles for children have heretofore included training bicycle products equipped with attachable/detachable pedal units. Owing to their small size, these training bicycles for children are usually not equipped with seat stays. Attachment/detachment of their pedal units and chains is therefore relatively easy. On the other hand, bicycles for adults are required to support heavy weight and therefore usually have seat stays. So there has been a problem that even if an adult bicycle with seat stays should be provided with an attachable/detachable pedal unit, a seat stay would get in the way and make detachment of the chain hard to achieve.

The configuration according to the present invention is applicable to bicycles of any size, including adult models, for enabling attachment/detachment of pedal unit and chain to be easily performed upon removal of the associated seat stay 150, thereby opening the way for even adults to casually engage in bicycle riding practice.

As shown in FIG. 1 to FIG. 4, in the present embodiment the seat stay 150 is detachably attached at opposite ends between the rear end side of the chain stay 130 and the upper part of the seat tube 120, thereby making the seat stay 150 detachably attachable as a whole. To be more specific, a bolt-and-nut fastening structure is adopted using a connection hole formed in the branch 132 near the rear end of the chain stay 130, a connection hole formed at the top part of the seat tube 120, and connection holes formed at opposite ends of the seat stay 150. When this structure is adopted, a strength improving effect can be expected owing to the fact that the branch 132 is provided outside the chain cover 250 so as to overlap the chain cover 250 in side view of the bicycle frame 100, thereby sandwiching the chain cover 250 with the branch 132. Moreover, by attaching the seat stay 150 outside of the chain cover 250, an overall stabilizing structure can be obtained by sandwiching the chain cover 250 with the seat stay 150. In addition, since the seat stay 150 is made detachably attachable as a whole with no intermediate gap being formed, strength of the bicycle frame 100 is enhanced when fitted with the seat stay 150.

The chain cover 250 is formed with a through-hole 252 for passage of the chain stay 130. The chain stay 130 is passed through the through-hole 252 from the outside rear toward the inside front of the chain cover 250. The attachment of the chain stay 130 through the through-hole 252 facilitates attachment of the chain cover 250. Moreover, in the present embodiment the chain cover 250 is divisible in forward-rearward direction and the through-hole 252 is formed to straddle the division in the chain cover 250. The fore-aft divisibility of the chain cover 250 further facilitates chain cover attachment (insertion of the chain stay 130 through the through-hole 252).

In another embodiment, as illustrated in FIG. 5 to FIG. 7, a configuration can be adopted wherein the distal end region (rear wheel side) of the chain stay 130 is nut-fastened together with the seat stay 150 using axle 302 of the rear wheel 300. More specifically, a rearwardly open oval hole 134 is formed in the rear end of the chain stay 130 and the rear end of the chain stay 130 is fastened on the axle 302 of the rear wheel 300 using a fastening member (a nut 136 in this embodiment) provided in the oval hole 134 (the axle 302 is threaded for engagement with the nut 136). Similarly, a rearwardly open oval hole 152 is formed in the rear end of the seat stay 150 and the rear end of the seat stay 150 is fastened on the axle 302 of the rear wheel 300 using a fastening member (the nut 136 in this embodiment) provided in the oval hole 152. In other words, the axle 302 passes through both the oval hole 134 of the chain stay 130 and the oval hole 152 of the seat stay 150 and the chain stay 130 and the seat stay 150 are together attached by tightening the nut 136. When this arrangement is adopted, the rear end sides of the chain stay 130 and seat stay 150 are given flat plate-like shapes so as to make nut-fastening easier. Moreover, the rearwardly open oval holes facilitate positioning of the chain stay 130 and seat stay 150 at the time of fastening. Although the seat stay 150 can be made detachably attachable as a whole by attachment at both ends as in the present embodiment, a configuration that enables only partial attachment/detachment of the seat stay 150 is also acceptable.

In the present embodiments, the seat stay 150 is made of the same steel as the bicycle frame 100 but it is not limited to such material and it is possible with a view to weight reduction to use aluminum, chromoly steel, carbon steel, titanium or resin or to suitably choose from among other materials offering adequate strength.

Although it is probably true that most people practice bicycle riding and learn how to ride from an early age, there are also a considerable number who reach middle school or adult age without doing bicycle training. Considering this situation, the unavailability of equipment for grownups to safely practice bicycle riding is a problem.

In order master bicycle riding, one must acquire two skills: (1) ability to maintain balance while seated straddling the bicycle body and (2) how to pump the pedals. As means for making these two skills easier to acquire, attention has in recent years focused on training bicycles with detachable pedals for use by children starting to practice bicycle riding. By making the pedals detachable, sense of balance can be readily mastered with a lightweight pedal-less bicycle. Then by attaching the pedals and practicing pedal pumping, even a child with poor coordination can learn to ride a bicycle. Although selecting a training bicycle of a size matched to one's body size is important, none of a size suitable for adults are actually available. So a big problem exists for adults wanting to engage in such bicycle training because it requires dismantling of an adult bicycle.

Pedal installation and removal is normally a job for a bicycle mechanic. So a bicycle whose pedals can be easily attached and detached by the user (rider) is desirable. For this, there is a need for a bicycle that allows very simple pedal installation and removal, without involving removal of brakes or other safety equipment or requiring removal of components requiring use of special tools, such as wheels.

If, for example, a bicycle frame without seat stays is used, the pedals and chain can be removed and reinstalled with the rear wheel and brake left unremoved as they are. This type of frame might be effective for use in a bicycle for small, lightweight kids, but for use by larger and stronger grade school and older children or adults, thick chain stays need to be installed to ensure strength, so that the bicycle becomes too heavy and unsuitable for use as a training bicycle.

By enabling removal of the structural members, called seat stays, that connect the rear wheel and the seat post so as to overcome this problem, the pedals and chain can be removed and reinstalled with the rear wheel and brake left unremoved as they are.

By utilizing the bicycle and bicycle frame according to the present invention, it has become possible to easily perform pedal removal and reinstallation in diamond frames excelling in balance between lightweight and strength, as well as in bicycle frames of various other shapes. It has also become possible to use bicycle frames of various sizes, large and small, ranging from child to adult types, as frames for training bicycles, thus making it possible to offer bicycles and bicycle frames that can be enjoyed by a wide range of people.

While the foregoing explanation is directed to embodiments of the present invention, the embodiments described in the foregoing are merely examples that in no way limit the technical scope of the present invention. Various other modifications and changes may be made to the present invention without departing from the scope of the invention set out by the claims.

EXPLANATION OF SYMBOLS

1 Bicycle
100 Bicycle frame
110 Receiving member
120 Seat tube
130 Chain stay
132 Branch
134 Oval hole (chain stay)
136 Fastening member (nut)
140 Down tube
150 Seat stay
152 Oval hole (seat stay)
160 Head tube
170 Top tube
200 Pedal unit
210 Chain wheel
220 Pedal crank
230 Connecting member
240 Pedal
250 Chain cover
252 Through-hole
300 Rear wheel
302 Axle (rear wheel)
310 Rear sprocket
400 Handlebar structure
410 Handlebar
420 Front wheel
430 Front fork
500 Chain

The invention claimed is:

1. A pedal unit attachable/detachable training bicycle comprising:

a bicycle frame comprising a receiving member provided at bottom of a seat tube to connect a pedal unit;

the pedal unit is configured to detachably attach to the receiving member;

a chain threaded between the pedal unit and a rear wheel;

wherein the pedal unit rotatably retains a pedal crank comprising an axially attached chain wheel and incorporates a connector configured to connect to the receiving member, and the chain is configured to attachably/detachably connect the pedal unit and chain to the bicycle frame upon being wrapped around the chain wheel and a rear sprocket installed on the rear wheel; and wherein the bicycle frame comprises seat stays on both sides of the rear wheel, and the bicycle frame is configured to enable a seat stay only on a side of the chain wheel to be freely attached to and detached from the bicycle frame;

wherein the bicycle frame comprises, at least on a chain wheel side of the bicycle frame, a chain stay that rotatably fastens the rear wheel;

wherein the chain stay comprises a forward-upwardly extending inclined branch towards a rear wheel side end of the chain stay on the side of the chain wheel;

wherein a rear end side of the seat stay on the side of the chain wheel is being fastened to the forward-upwardly extending inclined branch of the chain stay; and wherein the pedal unit is equipped with a chain cover that covers the chain entirely, and the forward-upwardly extending inclined branch of the chain stay is provided outside the chain cover so as to overlap the chain cover in side view of the bicycle frame.

2. The training bicycle of claim 1, wherein a rearwardly open oval hole is formed in the rear end of the seat stay and the rear end of the seat stay is fastened on the axle of the rear wheel by a fastening member provided on the axle passing through the rearwardly open oval hole.

3. The training bicycle of claim 1, wherein the pedal unit is equipped with a chain cover that covers the chain entirely, the chain cover is formed with a through-hole for passing the chain stay, and the chain stay is passed through the through-hole from an outside rear toward an inside front of the chain cover.

4. The training bicycle of claim 3, wherein the chain cover is divisible in a forward-rearward direction and the through-hole is formed to straddle the division in the chain cover.

5. The training bicycle of claim 1, wherein the pedal unit is equipped with a chain cover that covers the chain entirely, and the seat stay is attached between a rear end of the chain stay and an upper side of the seat tube, and an end side of the seat stay is attached outside the chain cover.

6. The training bicycle of claim 1, wherein the seat stay comprises a detachably attached member at either end of the seat stay to detachably attach the seat stay as a whole to the bicycle frame by detachably attaching both ends of the seat stay.

* * * * *